United States Patent [19]

Watanabe et al.

[11] Patent Number: 5,472,657
[45] Date of Patent: Dec. 5, 1995

[54] METHOD FOR MOLDING PLASTIC SHUTTER FOR MAGNETIC DISK CARTRIDGE

[75] Inventors: Seiichi Watanabe; Tadashi Irie; Naoyoshi Chino, all of Kanagawa, Japan

[73] Assignee: Fuji Photo Film Co., Ltd., Kanagawa, Japan

[21] Appl. No.: 281,538

[22] Filed: Jul. 28, 1994

Related U.S. Application Data

[63] Continuation of Ser. No. 933,700, Aug. 24, 1992, abandoned.

[30] Foreign Application Priority Data

Aug. 26, 1991 [JP] Japan ..................... 3-236788

[51] Int. Cl.⁶ ............................................. B29C 45/54
[52] U.S. Cl. ............................ 264/328.1; 264/328.17
[58] Field of Search ........................ 264/328.1, 328.17, 264/328.18, 328.19, 331.11

[56] References Cited

U.S. PATENT DOCUMENTS 4,698,714  10/1987  Sugawara et al. .

FOREIGN PATENT DOCUMENTS 60-231985  11/1985  Japan .

OTHER PUBLICATIONS

Rosato, Dominick V. editor, *Injection Molding Handbook*, 1986 pp. 60–67 and 98–105.

*Primary Examiner*—Jill L. Heitbrink
*Attorney, Agent, or Firm*—Sughrue, Mion, Zinn, Macpeak & Seas

[57] ABSTRACT

In a method for injection molding a plastic shutter for a magnetic disk cartridge, the shutter having windows corresponding to an opening formed in a magnetic disk cartridge and being substantially U-shaped in section, the diameter of an injection cylinder for injecting molten resin for forming the shutter is determined according to the following equation:

$$D^2 = A \times C \times M / \pi$$

where D is the diameter (mm) of the injection cylinder, C is the number of the plastic shutters molded simultaneously with one metal mold, M is the volume (cm³) of the plastic shutter, and A is the cylinder coefficient of the injection cylinder and is limited as follows:

$$130 \leq A \leq 510.$$

The inventive method is considerably stable, being free from the difficulties that short shot occurs with the metal mold, and the resultant shutter is deformed near the gate of the metal mold, or bent in its entirety.

4 Claims, 2 Drawing Sheets

METHOD FOR MOLDING PLASTIC SHUTTER FOR MAGNETIC DISK CARTRIDGE

This is a continuation of application Ser. No. 07/933,700 filed Aug. 24, 1992 now abandoned.

BACKGROUND OF THE INVENTION

The present invention relates to a method for manufacturing a shutter for a magnetic disk cartridge, and more particularly to a method for molding a plastic shutter from synthetic resin.

Disk-shaped recording media such as a magnetic disk, an optical disk, and a photo-magnetic disk are accommodated in cartridges relatively high in rigidity so that they can be handled with ease and are protected from being adversely affected by dust. In recording data on or reproducing data from a disk-shaped recording medium, the latter is loaded in a data recording and reproducing apparatus while being retained within the cartridge.

One example of a disk cartridge of this type is a 3.5 inch micro floppy disk. The micro floppy disk is composed of an upper half shell and a lower half shell which are made of ABS resin or the like, the shells being relatively high in hardness and rectangular, and a magnetic disk accommodated in the space defined by the upper half shell and the lower half shell. The magnetic disk is a flexible magnetic recording medium manufactured by uniformly forming a magnetic layer on the surface of a disk-shaped macromolecular film support. The magnetic disk has an opening at the center, to which a ring-shaped center core is secured.

Furthermore, as shown in FIG. 2, the disk cartridge 21 has a magnetic head inserting opening 28 formed in the upper and lower half-shells 23 and 24, respectively through which a magnetic head and head pad are insert to write data on the disk or read data from the disk. In order to prevent the entrance of dust into the cartridge through the magnetic head inserting opening 28, that is, in order to prevent the dust from being accumulated on the magnetic disk, the cartridge has provisions for opening and closing the magnetic head inserting opening 28, namely, it is provided with a slide shutter 22.

The shutter 22 is made up of an upper plate 22a, a lower plate 22b, and a side plate 22c through which the upper plate 22a is connected with the lower plate 22b, and thus the shutter 22 is substantially U-shaped in section. The shutter 22 has protrusions 50 which extends from the base of the lower plate 22. The protrusions 50 are slidably engaged with a guide groove (not shown) formed in the front edge portion of the lower half shell 24. The shutter also has another protrusion 51, which extends from the side plate 22c, for engaging with one of the end portions of a torsion spring 52. That is, with the protrusion 50 engaged with the guide groove, the shutter may be slid to open and close the magnetic head inserting opening 28. In this case, the shutter 22 is allowed to slide in a slide region 26 which extends from the periphery of the magnetic head inserting opening 28 to one side of the disk cartridge 21.

Conventionally, the slide shutter has been made of a metal plate such as a thin stainless steel plate. On the other hand, recently a slide shutter molded form synthetic resin has been proposed in the art as disclosed by Japanese Unexamined Published Patent Application No. 231985/1985. Manufacture of the metal slide shutter requires a relatively large number of manufacturing steps and high accuracy. On the other hand, the resin slide shutter can be formed by injection molding. That is, the resin slide shutter can be more easily manufactured, and moreover is lower in manufacturing cost.

A metal mold for molding the above-described resin slide shutter from synthetic resin is as shown in FIG. 3. Slide cores 31 and 32 are provided on both sides of a central core 30. FIG. 3 is an enlarged sectional view of the metal mold, corresponding to a sectional view taken along line A—A in FIG. 2.

The central core 30 and the slide cores 31 and 32 define an injection cavity 40 similar in configuration to the shutter 22. The slide cores 31 and 32 have protrusions 31a and 32a to form the openings 25 in the upper and lower plates 22a and 22b, respectively.

Molten resin is injected into the injecting cavity 40 through a gate (not shown). After the resin thus injected has been solidified to a predetermined degree, the slide cores 31 and 32 are slid (in the directions of the arrows B and C) so as to be moved away from the central core 30. Thereafter, the shutter 22 is ejected from the metal mold with an ejector pin (not shown) provided in the central core 30.

The thickness t of the injecting cavity 40 is extremely small (about 0.2 mm to 0.5 mm). Therefore, if the injection pressure is small, then a so-called "short shot" may occur. This difficulty may be eliminated by increasing the injection pressure. However, in this case, the product may be, for instance, inflated near the gate, or bent unintentionally; that is, it may be deformed. In addition, when the injection pressure is high, the resin is liable to be pushed out of the cavity at the corners of the slide cores 31 and 32 which are held abutted against the central core 30.

This difficulty that the resin is pushed out in this way occurs more frequently after the metal mold has been used many times, so that burrs are formed along the outer edges of the shutter 22 and the edges of the openings 25. The burrs formed on the slide surface of the shutter 22 tend to be fall off as the shutter 22 slides along the slide region 26. Of those burrs, especially the ones formed along the edges of the openings 25 may drop into the cartridge 21 through the openings 28. The burrs once inside the cartridge 21 can scratch the magnetic disk and damage the magnetic disk cartridge itself to the extent that the latter is no longer usable.

Heretofore, selection of an injection molding machine to be used for formation of the shutter 22 depends greatly on the experience of the operator. That is, a standard for manufacture of the shutter with high efficiency has not been clearly established yet.

SUMMARY OF THE INVENTION

Accordingly, an object of this invention is to eliminate the above-described difficulties accompanying a conventional method for forming a plastic shutter for a magnetic disk cartridge. More specifically, an object of the invention is to provide a method for molding a plastic shutter for a magnetic disk cartridge which method is considerably stable, being free from the difficulties that short shot occurs with the metal mold, and the resultant shutter is deformed near the gate of the metal mold, or bent in its entirety.

The foregoing and other objects of the invention have been achieved by the provision of a method for manufacturing a plastic shutter for a magnetic disk cartridge, in which, according to the invention, in injection-molding a plastic shutter which has openings or windows corresponding to an opening formed in the cartridge and is substantially U-shaped in section, the diameter of an injection cylinder for injecting molten resin is determined according to the following equation:

$$D^2 = A \times C \times M/\pi$$

where D is the diameter (mm) of the injection cylinder, C is the number of the plastic shutters molded with one metal mold, M is the volume (cm$^3$) of the plastic shutter, and A is the cylinder coefficient of the injection cylinder and is limited as follows:

$$130 \leq A \leq 510.$$

DESCRIPTION OF THE PREFERRED EMBODIMENTS

An example of an apparatus for practicing a method for molding a plastic shutter for a magnetic disk cartridge according to the invention will be described in detail.

Figure 1:
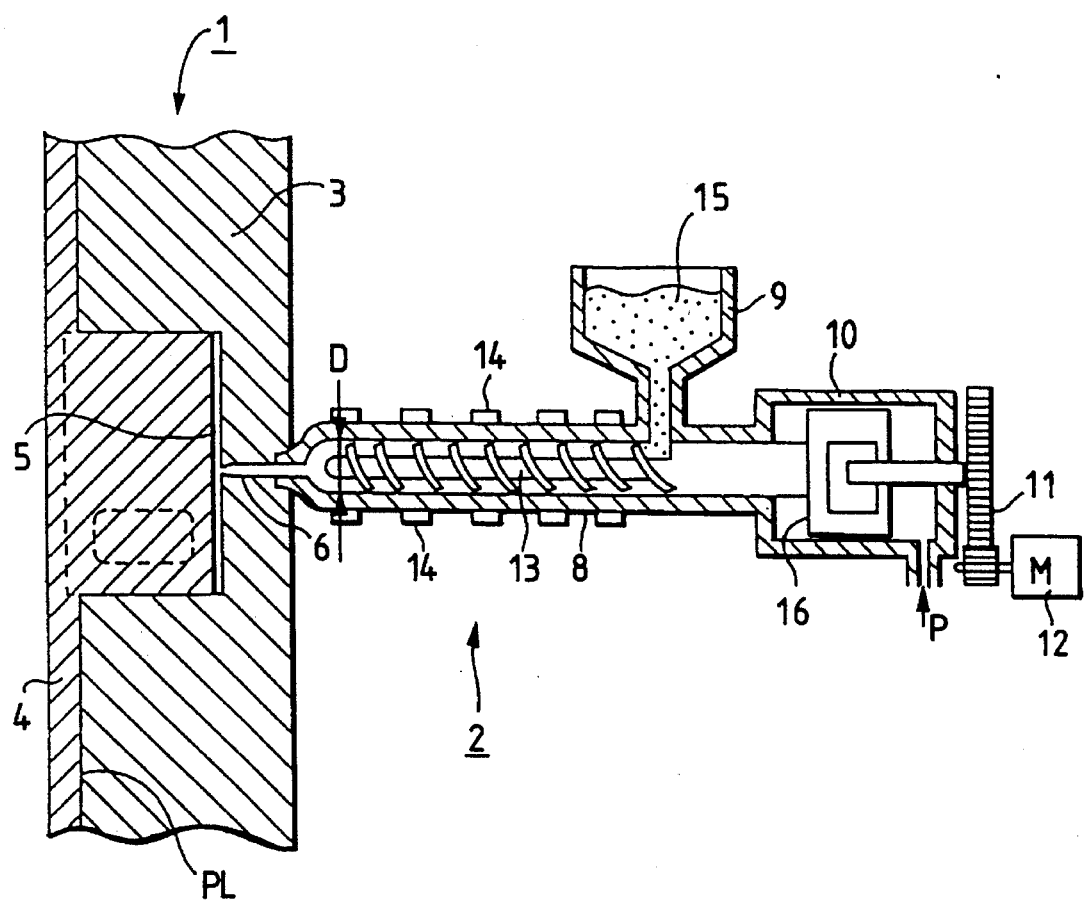
FIG. 1 is a sectional view outlining the arrangement of an injection molding machine for practicing a method for molding the plastic shutter of a magnetic disk cartridge according to the invention.
Figure 2:
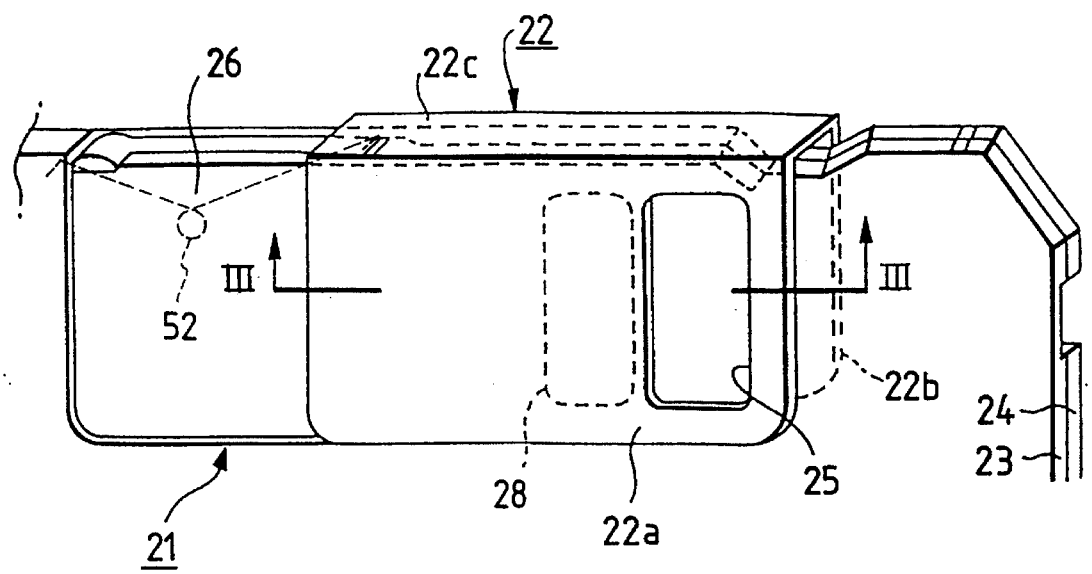
FIG. 2 is a perspective view showing a part of a 3.5 inch micro floppy disk where its shutter is mounted.
Figure 3:
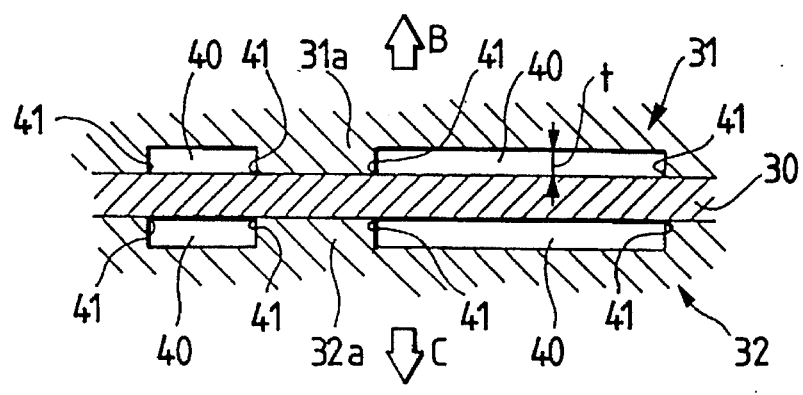
FIG. 3 is a sectional view of a shutter forming metal mold, corresponding to a sectional view taken along a line III—III in FIG. 2.
Figure 4:
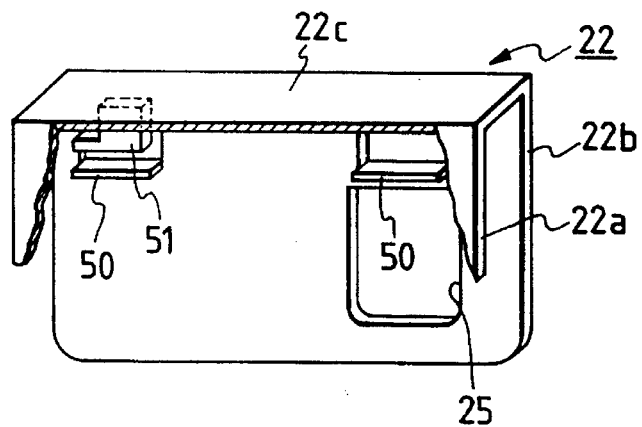
FIG. 4 is another perspective view showing a part of the inside of the shutter.

FIG. 1 shows the arrangement of an injection molding machine suitable for carrying out the invention. More specifically, FIG. 1 shows a part of a metal mold 1 for plastic shutter, and a part of an injection device 2 in the injection molding machine.

The metal mold 1 is composed of a stationary mold 3 and a movable mold 4. The stationary mold 3 and the movable mold 4 when moved together define an injection cavity 5 to mold the plastic shutter 22 shown in FIG. 1. The injection cavity 5 is communicated with a gate 6 through which molten resin is injected into the metal mold 1. For simplification in illustration, only one injection cavity 5 is shown in FIG. 1. However, usually four or eight injection cavities (5) are formed in the metal mold 1, and resin is injected into those cavities 5 simultaneously, thereby to form four or eight shutters simultaneously.

The injection device 2 is a so-called screw type injection device. The device includes a heating cylinder 8 for melting a molding material, band heaters 14 surrounding the heating cylinder 8, a screw 13 for conveying the molding material and kneading and injecting molten resin into the metal mold, a hydraulic cylinder 10 for giving an injecting force to the screw, the cylinder 10 having a piston 16, a hydraulic motor 12 for applying torque through a speed reducer 11 to the screw 13, and a hopper 9 for supplying the molding material to the heating cylinder 8. A quantity of resin to be injected is determined by the stroke of the piston 16.

In this embodiment, the material for molding the plastic shutter 22 is preferably a resin such as polyoxymethylene resin having a high mechanical strength, and it may be mixed with filler when necessary.

The plastic shutter 22 is molded with the injection molding machine as follows:

The molding material in the hopper 9 is dropped into the heating cylinder 8 in which the screw 13 is kept rotating. Hence, the molding material, while being kneaded by the screw 13, is conveyed along the grooves of the screw to the end portion of the cylinder 8. In this operation, while the band heaters 14 surrounding the heating cylinder 8 heat the molding material directly, the kneading action of the screw 13 produces frictional heat in the molding material, as a result of which the molding material is rendered molten.

As the molten resin collects in the end portion of the heating cylinder 8, the reaction (back pressure) of the molten resin pushes the screw 13 backwardly. The amount of backward movement of the screw 13 is detected with a limit switch or the like to stop the rotation of the screw 13 at a certain position, thereby to determine (or measure) a quantity of molding material to be injected.

Under this condition, the piston 16 in the hydraulic cylinder 10 applies an injecting pressure to the screw 13. As a result, the screw 13 serves as an injecting plunger to inject the molten resin from the end portion of the heating cylinder 8 into the metal mold 1 under a predetermined high pressure. More specifically, the molten resin is injected into the molding cavity 5 through the gate 6. In this case, if the injection time is excessively long, then the resultant molding is bent or deformed near the gate 6, whereas if the injection time is excessively short, the cavity is not fully filled with the molten resin. Thus it is preferable that the injection time be in a range of from about 0.07 sec to about 0.14 sec. The aforementioned polyoxymethylene resin is liable to be thermally decomposed when the melting temperature is around 230° C. and the injection time is in the above-described range. Therefore, if it is kept in the heating cylinder 8 for a long time, the resin tends thermally decompose so that burrs are liable to be formed. Thus, it is desirable that the molding cycle be completed within 13 seconds, and should be within at least 5 seconds with the resin plasticizing time taken into consideration.

After the molten resin filled in the molding cavity 5 is cooled and solidified suitably, the movable mold 4 is opened. The plastic shutter 22 thus molded is ejected for the metal mold with the ejector pin (not shown).

In the above-described embodiment, the injection molding machine is selected as follows: That is, in the machine, the diameter of the cylinder 8 is determined according to the following equation:

$$D^2 = A \times C \times M/\pi$$

where A is the cylinder coefficient of the injection cylinder with $130 \leq A \leq 510$, and where D is the diameter (mm) of the cylinder 8, C is the number of plastic shutters 22 to be formed simultaneously with one metal mold (usually four or eight), and A is the cylinder coefficient of the heating cylinder 8. With the machine thus selected, the molding is substantially free from difficulties that is bent as a whole, it is deformed near the gate 6, short shot occurs, and burrs are formed.

After the metal mold has been used for a time, resin debris or the like is accumulated in therein, and therefore, the metal mold must be cleaned frequently. This troublesome work may be eliminated by decreasing the cylinder coefficient A. That is, it has been confirmed that, in the case where the diameter D is 25 mm, satisfactory moldings can be formed with the metal mold 1 which is used continuously but cleaned every 24 hours. This effect, contributing to a reduction of the metal mold cleaning frequency, is particularly advantageous. However, it should be noted that, when the cylinder coefficient A is decreased, the cylinder diameter is decreased, and therefore in order to inject the resin in a predetermined period of time, the speed of rotation of the screw 13 must be increased accordingly. As a result, the position where the screw 13 stops is variable, and accordingly the shot is unstable.

With those conditions taken into consideration, it can be understood that it is considerably effective to determine the cylinder coefficient A according to $130 \leq A \leq 510$. However, the value most effective in eliminating of the difficulty of the shot becoming unstable is determined as follows: For instance, in the case where resin about 5.2 g in weight is injected in 0.07 sec to 0.14 sec, in order to prevent the shot from becoming unstable with the highest injection speed (0.07 sec), the lower limit should be $160 \leq A$, and the upper limit $A \leq 400$. Those data have been found through experiments. That is, limitation of the cylinder coefficient A in a range of $160 \leq A \leq 400$ narrower than the above-described range is greatly effective in many aspects.

The cylinder coefficient A is set according to the volume of the plastic shutter 22 and the stroke of the injection cylinder 8. When the cylinder coefficient A is in a small range, formation of burrs is eliminated and the shot is prevented from becoming unstable. Reduction of the cylinder coefficient A is advantageous in that when the cylinder coefficient A is small, the injection cylinder 8 is small in diameter, and accordingly its weight is small. Hence, when, upon completion of the injection, the injection cylinder 8 is braked, the adverse effect of the inertial force of the injection cylinder 8 can be avoided and the shot is prevented from becoming unstable. However, if the cylinder coefficient A is set to an excessively small value, then the resin plasticizing time may not be long enough, and the speed of injection must be considerably high. That is, it has been found through tests that the lower limit value of the cylinder coefficient A should be around 130. On the other hand, if the cylinder coefficient A is set to an excessively large value, then the stroke of the injection cylinder 8 is decreased greatly, with the results that burrs are formed, the shot becomes unstable, and the molding is deformed near the gate. Thus, the upper limit value of the cylinder coefficient A is about 510.

The effect of the cylinder coefficient A is most significant in the case where the molding is the order of 0.2 mm to 0.5 mm in thickness (t) and the length of the flow or resin from the gate, i.e., the distance between the gate and the point in the injecting cavity which is farthest from the gate, is 50 to 200 times the thickness (t).

The above-described embodiment of the invention concerns a 3.5 inch floppy disk. However, it goes without saying that the technical concept of the invention can be equally applied to other disk cartridges.

As described above, according to the invention, in injection-molding a plastic shutter which has windows corresponding to an opening formed in the cartridge and which is substantially U-shaped in section, the diameter of an injection cylinder for injecting molten resin is determined according to the following equation:

$$D^2 = A \times C \times M / \pi$$

where D is the diameter (mm) of the injection cylinder, C is the number of the plastic shutters molded with one metal mold, M is the volume (cm$^3$) of the plastic shutter, and A is the cylinder coefficient A of the injection cylinder and is limited as follows:

$$130 \leq A \leq 510$$

Hence, the diameter D can be determined with ease. With the method of the invention, the difficulty that an injection molding machine for molding the shutter 22 must be selected according to the operator's experience is eliminated. In addition, employment of the method of the invention eliminates other difficulties accompanying the prior art, namely, the occurrence of short shot, deformation of the molding near the gate 6, bending of the mold as a whole, and the formation of burrs. Thus, the plastic shutter of the invention can be manufactured with stability.

SPECIFIC EXAMPLES OF THE INVENTION

As conductive to a full understanding of the effects of the invention, specific examples thereof will be described.

The injection molding machine shown in FIG. 1 was used to mold plastic shutters with the molding conditions varied.

Inventive Example 1

An injection molding machine as shown in FIG. 1 was used. Metal molds for molding four and eight plastic shutters simultaneously were used. The injection cylinder was 50 mm in diameter. The mold clamping force was 150 tons. The resin used was polyoxymethylene, and the melting temperature was 190° to 230° C. The resultant moldings were each about 1.3 g in weight. With the molding cycle set to 8 sec, 10 sec, and 12 sec, a number of plastic shutters were formed to determine the best injection time. The plastic shutters thus formed were evaluated as indicated in Table 1. The evaluation items were "bending", "expanding near the gate", and "short shot",

TABLE 1

| Injection Time | Bending | Expanding | Short Shot |
|---|---|---|---|
| 0.05 | O | O | Δ |
| 0.06 | O | O | Δ |
| 0.07 | O | O | O |
| 0.10 | O | O | O |
| 0.14 | O | O | Δ |
| 0.16 | X | X | X |

Note:
O: Satisfactory;
Δ: Practically satisfactory;
X: Unsatisfactory

As is apparent from Table 1, with respect to bending, expanding, and short shot, the injection time should be 0.05 to 0.14 sec. However, if the injection time is excessively short, then all the air in the injection cavity is not discharged therefrom in the injection time; that is, part of the air is sealed in the injecting cavity. The air thus sealed is subjected to adiabatic compression, so that its temperature is greatly increased. As a result, the resin in contact with the air suffers from resin burn (gas burn). When the injection time was 0.06 sec or shorter, gas burn occurred. Thus, the most suitable injection time was thus in a range of from 0.07 sec to 0.14 sec.

Inventive Example 2

The injection molding machine as shown in FIG. 1 was used. The metal molds for forming four and eight shutters simultaneously were used. The injection cylinders different in diameter, 25 mm, 32 mm, 40 mm and 50 mm, were used. The mold clamping force was 150 tons. The resin used was polyoxymethylene, and the melting temperature was 190° to 230° C. A number of plastic shutters about 1.3 g in weight were formed with the molding cycle set to 10 sec and with the injection time set to 0.10 sec. An investigation was conducted on the cylinder coefficients A.

The results of evaluation of the plastic shutters thus formed are as indicated in the following Table 2. The moldings were 1.3 g in weight. The evaluation items were "shot stability", "burr" and "gas burn".

TABLE 2

| Cylinder Diameter | Number of Moldings (formed with one mold) | Cylinder Coefficient A | Burrs | Shot Instability | Gas Burn |
|---|---|---|---|---|---|
| φ25 | 4 | 393 | ○ | 0.20 | ○ |
|  | 8 | 196 | ○ | 0.14 | ○ |
| φ32 | 4 | 643 | X | — | ○ |
|  | 8 | 321 | ○ | — | ○ |
| φ40 | 4 | 1005 | X | 0.44 | Δ |
|  | 8 | 502 | Δ | 0.23 | ○ |
| φ50 | 4 | 1570 | X | 0.48 | X |
|  | 8 | 785 | X | 0.39 | ○ |

Note:
○: Satisfactory;
Δ: Practically satisfactory;
X: Unsatisfactory

The shot instability was determined by measuring the amount of bending of samples taken from the manufactured plastic shutters every two hours while the manufacturing process was carried out continuously for twenty-four (24) hours. The amount of bending was measured according to the following expression: [(maximum amount of bending)—(minimum amount of bending)] mm. When the amount of bending was 0.25 mm or less, the molding was determined acceptable.

As is apparent from Table 2, when the cylinder coefficient was in a range of from 130 to 510, the moldings were satisfactory.

Inventive Example 3

The injection molding machine as shown in FIG. 1 was used. Metal molds were employed which were able to mold four and eight shutters simultaneously. Injection cylinders of diameters of 22 mm = (A=490) and 40 mm (A=1256) were used. The mold clamping force was 150 tons. The resin used was polyoxymethylene, and the melting temperature was 190° to 230° C. A number of plastic shutters about 1.3 g in weight were formed, with the molding cycle set to 4 sec, 5 sec, 7 sec, 10 sec, 13 sec, 15 sec and 30 sec and with the injection time set to 0.08 sec, 10 sec and 0.12 sec. And the most suitable molding cycle was determined.

The results of evaluation of the plastic shutters are as indicated in Table 3 and Table 4. Table 3 is for the case where four plastic shutters were formed with one metal mold, and Table 4 is for the case where eight plastic shutters were formed with one metal mold. The evaluation items were "burrs", and "cooling" (as the molding cycle is reduced, the cooling time becomes shorter).

TABLE 3

| Molding cycle | Burrs φ25 | Burrs φ40 | Cooling |
|---|---|---|---|
| 4 sec | Δ | X | X |
| 5 sec | ○ | X | Δ |
| 7 sec | ○ | X | ○ |
| 10 sec | ○ | X | ○ |
| 13 sec | ○ | X | ○ |
| 15 sec | X | X | ○ |
| 30 sec | X | X | ○ |

TABLE 4

| Molding cycle | Burrs φ25 | Burrs φ40 | Cooling |
|---|---|---|---|
| 4 sec | X | X | X |
| 5 sec | ○ | ○ | Δ |
| 7 sec | ○ | ○ | ○ |
| 10 sec | ○ | ○ | ○ |
| 13 sec | ○ | Δ | ○ |
| 15 sec | X | Δ | ○ |
| 30 sec | X | X | ○ |

Note:
○: Satisfactory;
Δ: Practically satisfactory;
X: Unsatisfactory

As is apparent from Table 3 and Table 4, the best results were obtained when the molding cycle was in a range of from 5 sec to 13 sec.

What is claimed is:

1. A method for manufacturing a plastic shutter for a magnetic disk cartridge by injecting molten synthetic resin into a molding cavity with an injection cylinder, said shutter having windows corresponding to an opening formed in said cartridge and being substantially U-shaped in section, the improvement wherein the diameter of said injection cylinder is determined according to:

$$D^2 = A \times C \times M/\pi$$

wherein D is the diameter in millimeters of said injection cylinder, C is the number of said plastic shutters molded simultaneously with one metal mold, M is the volume in cubic centimeters of said plastic shutter, and A is the cylinder coefficient of said injection cylinder and is limited as follows:

$$160 \leq A \leq 400$$

a thickness of said shutter being in the range of 0.2 to 0.5 mm.

2. The method as claimed in claim 1, wherein, in the case where said synthetic resin is polyoxymethylene resin, an injection time of said molten resin is in a range of 0.07 sec to 0.14 sec.

3. The method as claimed in claim 2, wherein a total molding cycle time for molding said shutter is in a range of 5 to 13 seconds.

4. A method as recited in claim 1, wherein C=8 and the cylinder coefficient satisfies the following:

$$196 \leq A \leq 321.$$

* * * * *